United States Patent
Cowan et al.

(10) Patent No.: US 8,996,866 B2
(45) Date of Patent: Mar. 31, 2015

(54) UNOBTRUSIVE ASSURANCE OF AUTHENTIC USER INTENT

(75) Inventors: Crispin Cowan, Bellevue, WA (US); Matthew Z. Tamayo-Rios, Redmond, WA (US); Tanmoy Dutta, Sammamish, WA (US); John Lambert, Redmond, WA (US); Paul J. Leach, Seattle, WA (US); Scott A. Field, Redmond, WA (US); Thomas C. Jones, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 900 days.

(21) Appl. No.: 12/645,465

(22) Filed: Dec. 22, 2009

(65) Prior Publication Data

US 2011/0154505 A1 Jun. 23, 2011

(51) Int. Cl.
  *G06F 21/52* (2013.01)
  *G06F 21/62* (2013.01)
  *G06F 21/53* (2013.01)

(52) U.S. Cl.
  CPC .......... *G06F 21/52* (2013.01); *G06F 21/62* (2013.01); *G06F 21/53* (2013.01)
  USPC ............ 713/166; 713/164; 713/167; 726/22; 726/26

(58) Field of Classification Search
  None
  See application file for complete search history.

(56) References Cited

U.S. PATENT DOCUMENTS

| | | | |
|---|---|---|---|
| 6,308,274 B1 | 10/2001 | Swift | |
| 6,694,434 B1* | 2/2004 | McGee et al. | 713/189 |
| 7,418,734 B2* | 8/2008 | Berg et al. | 726/25 |
| 7,475,431 B2 | 1/2009 | Chao | |
| 8,442,960 B1* | 5/2013 | Meyer et al. | 707/694 |
| 2004/0153712 A1* | 8/2004 | Owhadi et al. | 714/4 |
| 2005/0278790 A1* | 12/2005 | Birk et al. | 726/26 |
| 2006/0179482 A1* | 8/2006 | Alcazar et al. | 726/22 |
| 2008/0040797 A1 | 2/2008 | Schwartz et al. | |
| 2008/0215897 A1 | 9/2008 | Doyle et al. | |
| 2009/0113425 A1* | 4/2009 | Ports et al. | 718/1 |

OTHER PUBLICATIONS

Garrett, R.,".NET Wrapper for COM Elevation", http://blog.robgarrett.com/2007/02/12/net-wrapper-com-elevation/, Feb. 12, 2007.*
Brunette, et al. , "Using Solaris™ Operating System Security to Address Payment Card Industry (PCI) DSS Compliance: A Systemic Approach to Security", Retrieved at <<http://www.sun.com/software/whitepapers/solaris10/security_pci.pdf>>, Jul. 2007, pp. 16.

(Continued)

*Primary Examiner* — Alexander Lagor
(74) *Attorney, Agent, or Firm* — Timothy Chuma; Kate Drakos; Micky Minhas (57) ABSTRACT

Computer-executable instructions that are directed to the performance of consequential actions and automatically elevate to execute at a higher privilege level to do so can perform such consequential actions only after user notification. Doing so can enable monitoring processes to avoid presenting duplicative user notification upon detection of such auto-elevation. In addition, prior to presenting user notification, input from the execution environment can be ignored and access to DLLs for performing consequential actions can be avoided. A static analyzer can identify non-conforming computer-executable instructions. A wrapper can be utilized to provide compliance by otherwise unknown or non-conforming computer-executable instructions.

19 Claims, 6 Drawing Sheets

(56) References Cited

OTHER PUBLICATIONS

Chakraborty, Rajdeep, "Rogue Security Software", Retrieved at <<http://www.malwareinfo.org/files/RogueAntiSpyware.pdf>>, Aug. 28, 2008, pp. 12.

Shirley, et al., "The User is Not the Enemy: Fighting Malware by Tracking User Intentions", Retrieved at <<http://www.cs.virginia.edu/~evans/pubs/nspw08/nspw27-shirley.pdf>>, Sep. 22-25, 2008, Lake Tahoe, California, USA, pp. 13.

* cited by examiner

UNOBTRUSIVE ASSURANCE OF AUTHENTIC USER INTENT

BACKGROUND

Traditionally, computing devices performed tasks exclusively in response to input from users of the computing device. As computing devices, and application programs, became more powerful and complex, an increasing amount of tasks were performed by the computing devices in response, not to explicit user input, but rather to requests initiated by the execution of other computer executable instructions. Indeed, modern computing devices executing a typical operating system and suite of application programs perform a substantial number of tasks automatically and without explicit user input.

Unfortunately, not all of the tasks automatically performed by a computing device may be tasks that the user of such a computing device actually wanted performed. For example, malicious instructions, when executed, may cause the computing device to erase, change, or send elsewhere, some or all of a user's data, including data that may be very difficult for the user to reconstruct, operate without, or wish to have disseminated. To a user of such a computing device, such malicious instructions may be very obvious, but to the processes being executed on the computing device which were tasked to perform these instructions, there may be no meaningful way to distinguish between legitimate tasks and those requested by malicious instructions.

Forcing a computing device to "double-check" each instruction, or even each instruction capable of affecting the user's data, with a user prior to performing the instruction can cause the user to be bombarded with questions from the computing device, potentially as often as multiple times every second. Even if substantial filtering is applied, thereby reducing the number of times that the computing device double-checks its actions with a user prior to performing them, users can quickly grow tired of the repeated double-checks. A user's frustration can be further increased if such double-checks occur immediately upon the heels of an explicit instruction by the user requesting that the computing device perform the very action it is now double-checking. As a result, users can become immune to, or downright ignore, the information presented in such repeated double-checks, and can, as a result, simply proceed to approve every double-checked action. Of course, blanket approval, whether by the user or otherwise, negates the purpose of such double-checks in the first place.

SUMMARY

Only a small percentage of actions performed by a computing device can have a sufficient impact on the user's data, or the overall computing system, to be considered "consequential". Typically, such consequential actions are only allowed to be performed by computer-executable instructions executing at a high privilege level and, as a result, are typically performed by computer-executable instructions that automatically elevate to a higher privilege level appropriate for the performance of such actions. For such automatically elevating computer-executable instructions, a user input directed to such computer-executable instructions can be required, and, in doing so, the ability of malicious instructions to utilize such automatically elevating computer-executable instruction to cause the performance of consequential actions can be mitigated. However, redundant user input, or otherwise asking the user for verification when the user has already provided an explicit instruction, can be avoided to prevent the user from becoming immune to the message.

In one embodiment, computer-executable instructions that perform consequential actions can be required to first present a user interface and perform such consequential actions only in response to user input received through the presented user interface. Such computer-executable instructions can be "auto-elevating" in that they can automatically seek to execute at a higher privilege level appropriate for the consequential action they are attempting to perform. The presented user interface can be, likewise, at a high privilege level and the input to such an interface can be limited to user input received from input devices or other like sources that also execute at a high privilege level. Once the user input is received through the presented user interface, the consequential action can be performed without requiring further verification from the user, or otherwise double-checking with the user, and thereby requiring the user to provide more input in furtherance of the initial input the user already provided.

In another embodiment, compliance with a defined set of guidelines regarding the performance of consequential actions only in response to user input can be tested through static analysis of existing computer-executable instructions. Such testing can identify computer-executable instructions that do not conform with the defined set of guidelines.

In a further embodiment, a wrapper mechanism can be utilized to provide compliance with a defined set of guidelines regarding the performance of consequential actions only in response to user input for existing computer-executable instructions. When such existing computer-executable instructions are executed by a computing device, the wrapper mechanism can be automatically utilized in a manner transparent to a user of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the performance, in an unobtrusive manner, of consequential actions in accordance with a user's intent. Computer-executable instructions seeking to perform consequential actions, including computer-executable instructions that can auto-elevate to a higher privilege level appropriate for the performance of such consequential actions, can first present a user interface and can perform consequential actions only in response to user input through such a user interface. The presented user interface can be of a sufficiently high privilege level to avoid interference by malicious instructions. Additionally, computer-executable instructions seeking to perform consequential actions can avoid receiving input, or instructions, from any lower privileged execution environment. An existing set of computer-executable instructions can be statically examined to identify non-compliant instructions. Additionally, a wrapper can be executed to provide compliance for otherwise noncompliant computer-executable instructions.

For purposes of illustration, the techniques described herein make reference to specific types of user interfaces and specific types of consequential actions. Such references are strictly exemplary and are not intended to limit the mechanisms described to the specific examples provided. Indeed, the techniques described are applicable to any computer-executable instructions that can auto-elevate from one privilege level to another, irrespective of the specific user interface utilized or consequential action performed, and irrespective of the specific host operating system, so long as such an operating system is capable of supporting two or more distinct levels of privilege.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
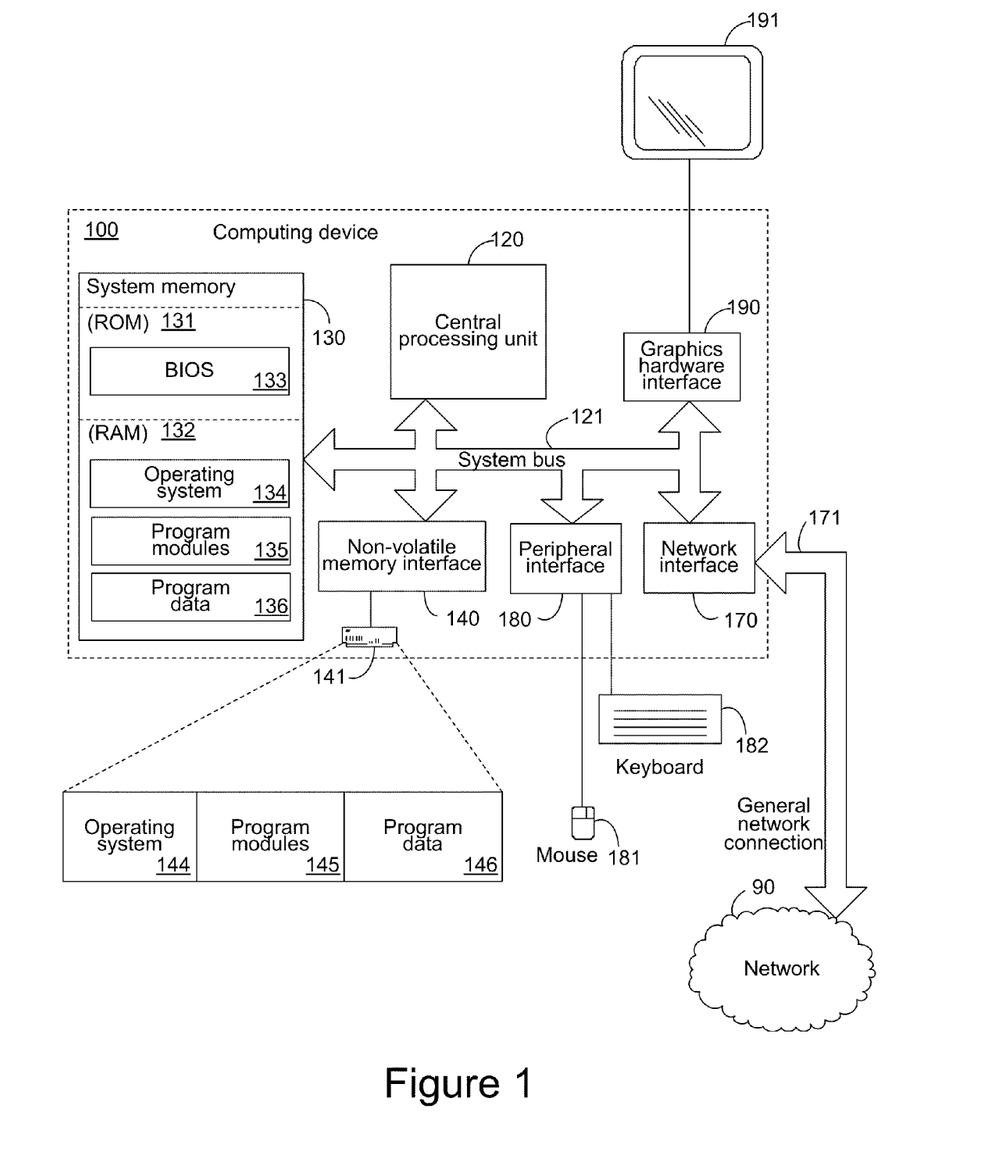
FIG. 1 is a block diagram of an exemplary computing device.

With reference to FIG. 1, an exemplary computing device 100 is illustrated upon which, and in conjunction with which, the below-described mechanisms can be implemented. The exemplary computing device 100 of FIG. 1 can include, but is not limited to, one or more central processing units (CPUs) 120, a system memory 130, that can include RAM 132, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, such as for the display of visual user interfaces, including, but not limited to, a graphics hardware interface 190 and a display device 191. Additionally, the computing device 100 can also include user interface elements, including, but not limited to a mouse 181 and a keyboard 182 that can be utilized by a user to generate input in response to the interface displayed via the display device 191. The user interface elements can be communicationally coupled to the system bus 121 via a peripheral interface 180 and use of the user interface elements by the user for the purposes of providing user input can generate signals that can be carried by the system bus 121 to computer-executable instructions executing as part of the operating system 134 which can, in turn, provide such user input to the operating system 134 or program modules 135, as appropriate.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and the aforementioned RAM 132. A basic input/output system 133 (BIOS), containing the basic routines that help to transfer information between elements within computing device 100, such as during startup, is typically stored in ROM 131. RAM 132 typically contains data and/or program modules that are immediately accessible to and/or presently being operated on by processing unit 120. By way of example, and not limitation, FIG. 1 illustrates the operating system 134 along with other program modules 135, and program data 136.

The computing device 100 may also include other removable/non-removable, volatile/nonvolatile computer storage media. By way of example only, FIG. 1 illustrates the hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 can operate in a networked environment using logical connections to one or more remote computers. The computing device 100 is illustrated as being connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

As noted previously, the operating system 134 and 144 can be any operating system that can provide for at least two levels of privilege. As will be known by those skilled in the art, privilege levels, as defined by an operating system, can provide for a mechanism by which the ability to perform actions is restricted in a defined manner. Thus, computer-executable instructions executed at what is considered a lower privilege level will not be allowed to perform certain actions that computer-executable instructions executed at what is considered a higher privilege level will be allowed to perform. To provide increased security, users of a computing device, such as the computing device 100, are encouraged to execute computer-executable instructions at a lower privilege level and those computer-executable instructions that are directed to tasks that can, traditionally, only be performed from the higher privilege level can "automatically elevate" or "auto-elevate" their execution to the higher privilege level to perform such tasks.

While references are made to "higher" and "lower" privilege levels, such references are intended to be relative only, and not absolute descriptions of one or more specific privilege levels. Indeed, the descriptions below are applicable to auto-elevating computer-executable instructions that elevate from one privilege level to another, higher, privilege level irrespective of the number of privilege levels (greater than two) implemented by the operating system 134 and 144. Thus, in an operating system that provides for, as an example, three privilege levels, the descriptions below are applicable to computer-executable instructions that auto-elevate from the lowest privilege level to the middle privilege level, from the middle privilege level to the highest privilege level, and even from the lowest privilege level to the highest privilege level, if allowed by the operating system.

Figure 2:
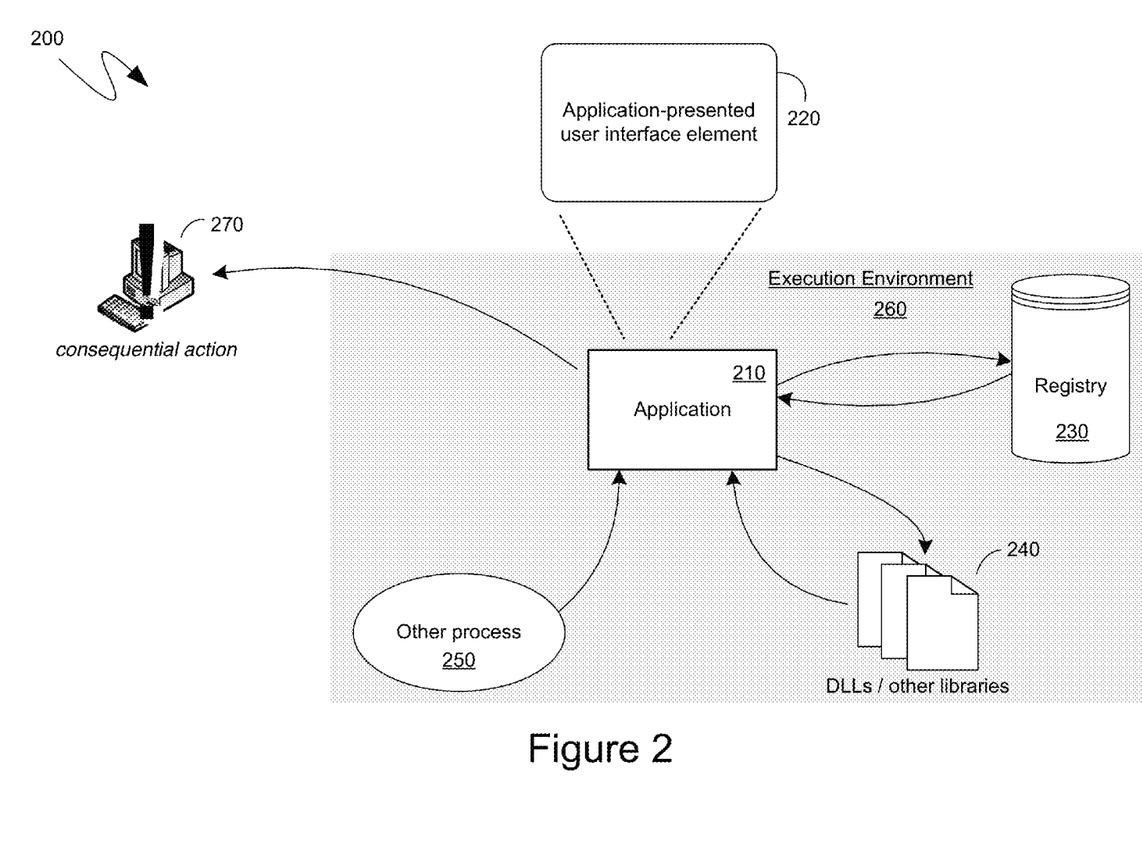
FIG. 2 is a block diagram of actions performed by an exemplary collection of computer-executable instructions.

Turning to FIG. 2, the system 200 shows an application 210, which can be one of the program modules 135 of FIG. 1, or a component of the operating system 134, also of FIG. 1, executing within an execution environment 260 on the computing device 100 of FIG. 1. The computer-executable instructions that comprise the application 210 can perform consequential actions, such as the symbolically-illustrated consequential action 270. As utilized herein, the phrase "consequential action" means an action that is reserved to only be performed by users and processes having a high privilege level. For example, consequential actions can include actions that add provisions for new users of the computing device, actions that format hardware peripherals communicationally coupled to the computing device, actions that make changes to protected aspects of the operating system 134 (shown in FIG. 1) and other like or analogous actions.

As indicated previously, modern operating systems, such as the operating system 134 (shown in FIG. 1), provide for various privilege levels, with computer-executable instructions executing in a higher privilege level having the authority to perform actions that computer-executable instructions executing in a lower privilege level may not have the authority to perform, and may be prevented from performing by the operating system. Traditionally, most computer-executable instructions are executed in a mid-range, or even low, privilege level so that if poorly written, or even malicious, computer-executable instructions are executed, they will not have the authority, and thus not be allowed, to perform consequential actions. As a result, however, computer-executable instructions whose purpose is to perform consequential actions often need to find a way to execute at an elevated privilege level in order to perform those consequential actions. One common mechanism by which computer executable-instructions associated with an application can execute at a privilege level higher than that at which the application was originally instantiated is to automatically elevate, or "auto-elevate", to a higher privilege level.

Traditionally such auto-elevation by computer executable instructions was detected, such as by mechanisms executing as part of the operating system 134 (shown in FIG. 1), and the user was alerted, typically through a notification that requested that the user either approve or deny the action that the auto-elevating computer-executable instructions sought to perform. As indicated previously, the net result of such alerting was the generating and displaying, to the user, of a meaningless double-check. Specifically, the user would have instructed an application to perform a consequential action and, when the computer-executable instructions of such an application auto-elevated to perform the action that the user instructed them to perform, the user would be presented with a further alert notification asking the user to either allow or deny the very action that the user had just instructed the application to perform.

Turning back to the system 200 of FIG. 2, as will be known by those skilled in the art, the execution environment 260 of an application, such as the application 210, can comprise the data and other computer-executable instructions that can be utilized by, or can instruct, the application. For example, some or all of the information stored as entries in a registration database, such as the registry 230, can be part of the execution environment 260 of application 210. Information stored within the registry 230 that can be part of the execution environment 260 of the application 210 can include user preferences, collections of data to be referenced, and actions to be performed, by the application 210, including, for example, upon startup or other initiation of execution of the computer-executable instructions that comprise the application 210.

As another example, one or more Dynamically Linked Libraries (DLLs), or other collections of computer-executable instructions, that can be invoked, or otherwise utilized, by the application 210 can likewise be part of the execution environment 260. Conversely, other executing processes 250 can also be part of the execution environment 260 in that, through inter-process communication, such other executing processes 250 can instruct, or otherwise utilize, the application 210.

In one embodiment, executing computer-executable instructions, such as those that comprise the application 210, that can perform consequential actions, such as the symbolically-illustrated consequential action 270, can not accept input from the execution environment 260. In particular, the application 210, since it is capable of performing consequential actions, can be an auto-elevating application and, as such, can not accept input from the execution environment 260 since such input can be an attempt by malicious, or otherwise improper, computer-executable instructions to leverage the auto-elevating application and thereby gain the ability to perform consequential actions at a higher privilege level than such malicious computer-executable instructions are otherwise limited to. Thus, for example, the application 210 can not read, or can otherwise ignore, information in the registry 230, especially information in the registry that instructs the application to perform one or more consequential actions. Similarly, the application 210 can not invoke DLLs, such as the DLLs 240, that can be from untrusted or unprotected locations or can otherwise be confined to execute at lower privilege levels. In such a manner, the performance of consequential actions, such as the symbolically illustrated consequential action 270, can be limited to executing computer-executable instructions, such as those found in the application 210, that the user has explicitly authorized to perform such consequential actions, or, at the very least, whose execution the user is aware of.

Traditionally, monitoring processes, such as those provided by the operating system 134 (shown in FIG. 1) cannot tell whether a consequential action, such as the symbolically-illustrated consequential action 270, was performed by an application, such as the application 210, in response to user input, or in response to instructions received from other executing processes or other collections of data. Thus, traditionally, to ensure that consequential actions are performed only if the user actually intended that they be performed, monitoring processes can request explicit approval from the user if they detect the auto-elevation of computer-executable instructions. Of course, as indicated previously, in situations where such auto-elevation is in response to explicit user instructions, the subsequent request for yet another explicit approval from the monitoring processes can appear redundant to the user, and can be a source of user annoyance.

If an executing process, such as the application 210, displays a user interface element, such as the application-presented user interface element 220, and performs consequential actions, such as a symbolically-illustrated consequential action 270, only in response to user input received through such a user interface, all consequential actions can be assumed to be in response to explicit user input and, as a result, the user need not be independently alerted, such as by an operating-system detection mechanism, when computer-executable instructions from such applications auto-elevate. As illustrated in the system 200, the application 210 can display one or more user interface elements, such as the application-presented user interface element 220 and with such user interface elements can provide the user with information about the application, its functionality and the context within which the application can perform consequential actions. Additionally, user interface elements presented by the application 210, such as the generic user interface element 220, can provide a communicational mechanism through which the user can authorize the application to perform a consequential action or instruct the application to not perform the consequential action.

In one embodiment, the user interface presented by the application 210, such as the generic user interface element 220, can be displayed at a higher privilege level to avoid defacing by malicious computer executable instructions. More specifically, if the generic user interface element 220 is displayed at the same privilege level at which malicious computer executable instructions may be executing, the malicious computer executable instructions can, in order to trick the user into causing the application 210 to perform a potentially malicious consequential action 270, deface the notification 220, such as by changing the wording or the meaning of the presented user interface. To protect against such defacing by malicious computer executable instructions, the user interface elements presented by the application 210 can be displayed by the application 210 at a privilege level higher than that at which such malicious computer executable instructions can be executing. For purposes of the mechanisms described herein, such higher privilege level user interface elements need not be limited to elements displayed on, for example, the display device 191 (shown in FIG. 1) that is part of the computing device 100 (shown in FIG. 1) on which the application 210 can be executing. Instead, for purposes of the mechanisms described herein, any user interface element 220 that, by its nature or construct, cannot be defaced by malicious computer executable instructions executing at the same privilege level as the application 210 can be considered a higher privilege level user interface element. Thus, for example, text messages sent to another device, voice messages delivered using external hardware, and other like user interface elements are also higher privilege level user interface elements as that term is used in describing the mechanisms below.

Another tactic by which malicious computer-executable instructions can attempt to trick the user into causing the application 210 to perform a potentially malicious consequential action 270 is take advantage of unintended user input. For example, malicious computer-executable instructions can display a user interface element that appears innocuous and, just as the user is about to click on a portion of that user interface element, the malicious computer-executable instructions can quickly launch an auto-elevating application, such as the application 210, that can perform a consequential action, such as the consequential action 270. As a result, the user's input, which was intended to be directed to the innocuous user interface element displayed by the malicious computer-executable instructions is, instead, directed to the auto-elevating application and provides the impetus for the auto-elevating application, such as the application 210, to perform a consequential action, such as the consequential action 270, that the user did not intend, or wish, to have performed. To guard against such unintended user input, the user interface element 220 can implement a delay such that it will not accept user input until it has been displayed, without being overdrawn, for a predetermined length of time, such as an amount of time within which a typical user could understand the context of the user interface element 220.

Additionally, the input to the application 210, and, in particular, the input received via the user interface presented by the application, can be from sources executing at a privilege level at least as high as the privilege level to which the application auto-elevated itself to. For example, input received from the user, such as via the mouse 181 (shown in FIG. 1) or the keyboard 182 (shown in FIG. 1) can be processed by relevant drivers and other input-related elements of the operating system 134 (shown in FIG. 1) and can then, if appropriate, be provided to the application 210. As will be known by those skilled in the art, the operating system 134 (shown in FIG. 1) can execute at a highest privilege level and, as such, input received from the user through user interface hardware can be considered as coming from a sufficiently high privilege level.

In another embodiment, the input to the application 210 can be, not from the user directly, such as via user interface hardware, but rather from other computer-executable instructions executing at a sufficiently high privilege level. More specifically, the execution environment 260 shown in FIG. 2 can represent the execution environment of a lower privilege level from which the application 210 was originally invoked, and from which the application auto-elevated itself to a higher privilege level. However, as will be known by those skilled in the art, an analogous execution environment can exist at the higher privilege level and, in the presently described embodiment, an auto-elevating application, such as the application 210, could accept input from such an environment because of the inherent security provided by such a higher-level privilege environment.

As indicated previously, applications whose computer-executable instructions conform to the above-described directives can be allowed to auto-elevate and perform consequential actions without additional, double-checking notifications presented by other processes executing as part of the computing system. More specifically, computer-executable instructions of conforming applications can be allowed to auto-elevate without causing further notification to be presented to the user. In one embodiment, applications that are not necessarily conforming can be executed within a wrapper environment that can provide for conformance.

Figure 3:
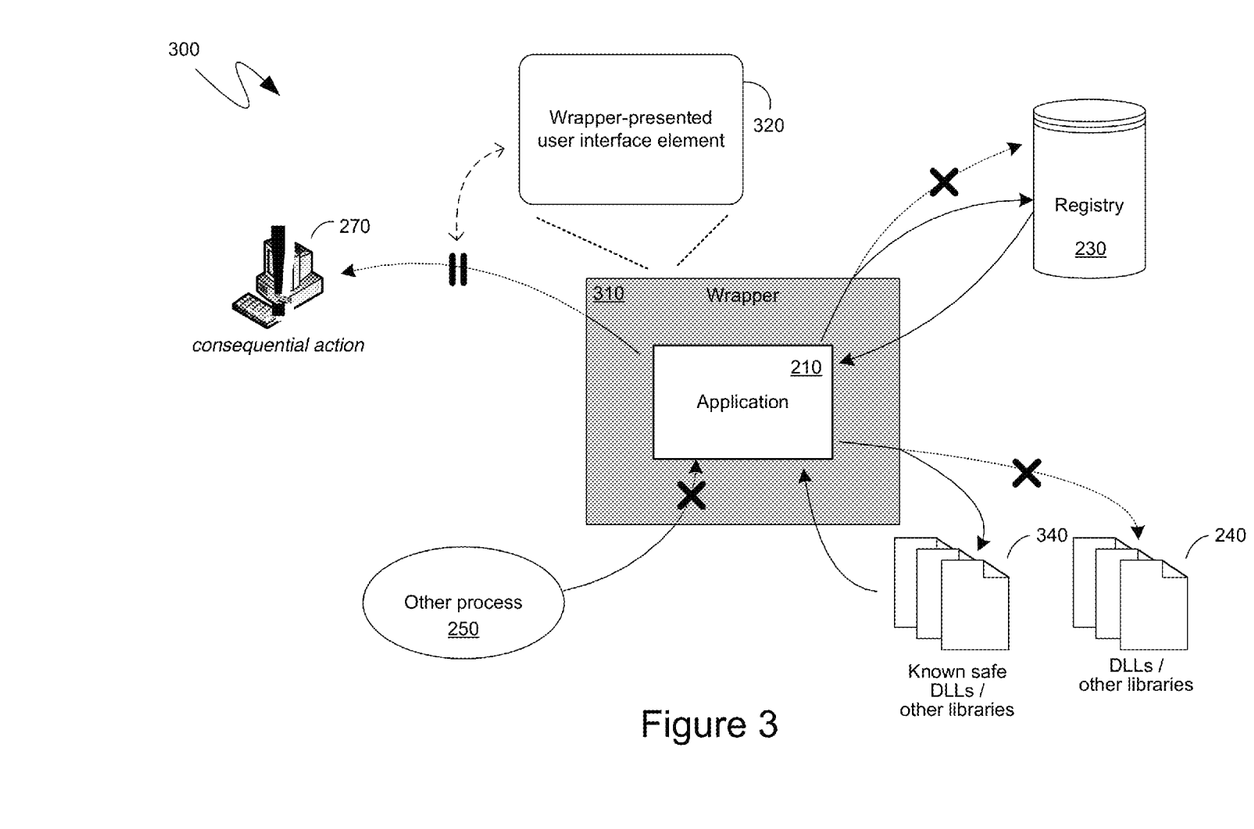
FIG. 3 is a block diagram of an exemplary wrapper for one or more collections of computer-executable instructions.

Turning to FIG. 3, the system 300 is an illustration of such a wrapper within the context of the application 210 and other components of the system 200 shown previously in FIG. 2, and described in detail above. As shown in the system 300, the wrapper 310 can employ one or more of various mechanisms to provide compliance, by the computer executable instructions of the application 210, to the above described directives. For purposes of illustration, the dashed lines shown in FIG. 3 represent attempted communications or actions that were blocked, interrupted, redirected, or otherwise affected by the wrapper 310. As an example of the mechanisms implemented by the wrapper 310, as shown in FIG. 3, the wrapper 310 can block, or otherwise interrupt, remote procedure calls from one or more other processes, such as the other process 250. As shown in FIG. 2, the other process 250, and other like processes that may attempt to utilize the auto-elevating application 210 via remote procedure calls, can be part of the execution environment 260 (shown in FIG. 2) from which the application 210 was originally executed. Consequently, because the application 210 can automatically elevate to a higher privilege level than the execution environment 260 (shown in FIG. 2), allowing the application 210 to accept remote procedure calls from processes in the lower privilege level execution environment can provide a mechanism by which those processes can gain the ability to perform consequential actions in the higher privilege level. To prevent malicious computer-executable instructions that may be executing in the lower privilege level execution environment 260 (shown in FIG. 2), from which the application 210 was originally executed, from gaining the ability to perform consequential actions in the higher privilege level to which the application auto-elevates, remote procedure calls from such malicious computer-executable instructions, or other processes 250, can be blocked by the wrapper 310.

In another embodiment, rather than merely interrupting communications, the wrapper 310 can instead redirect communications. Thus, as shown in FIG. 3, if the application 210 were to reference, or otherwise receive information from, a registration database, such as the registry 230, the wrapper 310 could redirect such references by the application to a portion of the registry that would be known not to contain information for, or instructions to, the application that would cause the application to perform a consequential action 270. Similarly, if the application 210 were to attempt to reference one or more DLLs or other libraries, such as the DLLs 240, the wrapper 310 could redirect such reference, or other access by the application, to known safe DLLs or other libraries such as the known safe libraries 340. Again, as in the case of remote procedure calls from other processes, such as the other process 250, entries in the registry 230 and DLLs or other libraries 240 can be compromised by malicious computer-executable instructions and, even if they are not, such elements represent aspects of a lower privilege level execution environment 260 (shown in FIG. 2) from which the application 210 was originally executed and from which it auto-elevated to a higher privilege level environment. Thus, as before, to prevent aspects of the lower privilege level execution environment 260 (shown in FIG. 2) from leveraging, or otherwise utilizing, the application 210 to perform consequential actions in the higher privilege level to which the application auto-elevated, the wrapper 310 can block or redirect access to portions of the registry 230 and DLLs or other libraries 240.

For example, an application, such as the application 210, can often be designed to reference an external database, such as the registry 230, upon startup or other initiation of execution of the computer-executable instructions of the application. Consequently, information contained within such an external database, such as the registry 230, can cause the application 210 to automatically perform, on startup, one or more consequential actions, such as the consequential action 270. For example, if the application 210 was directed to the addition or deletion of user accounts on the computing device 100 (shown in FIG. 1), information contained within an external database, such as the registry 230, could cause the application to, upon startup, check if a particular user account is present and, if such a user account is not present, create such an account. The automatic creation of a user account, without any notification to the user within whose account the application 210 is currently executing, can be exploited to the detriment of such a user. To prevent such exploitation, the wrapper 310 can prevent the application 210 from referencing those kinds of entries in the registry 230 in the first place. More specifically, as described generally above, the wrapper 310 could, in one embodiment, redirect the reference to the registry 230, from the application 210, to a portion of the registry that would not contain any instructions to the application, such as the above described instruction to automatically create a user account on startup.

In a similar manner, many applications, such as the exemplary application 210, can invoke existing system libraries or other DLLs. In one embodiment, if the application 210 has not previously presented a notification or any other user interface that provides the user with information about the application's actions and their context, such as the above described generic user interface element 220 (shown in FIG. 2), the wrapper 310 can redirect the application's access of system libraries or other DLLs, such as, for example, the DLLs 240, to other DLLs or other libraries, such as the DLLs 340. In one embodiment, the DLLs or other libraries 340 to which the application's access can be redirected by the wrapper 310 can be dummy libraries that perform no action.

Some operating systems, such as the operating system 134 (shown in FIG. 1), can provide existing infrastructure to enable the wrapper 310 to perform the above-described redirections. For example, some operating systems can provide a shim database, or other redirection engine or ability, that can be utilized by the wrapper 310 to perform the above-described redirections.

In another embodiment, if the application 210 either does not, or is not capable of, presenting a user interface, such as could include the above-described generic user interface element 220 (shown in FIG. 2), the wrapper 310 can itself display a user interface, such as the generic user interface element 320, on behalf of the application. Once a user interface, such as the generic user interface element 320, or some other form of notification is displayed to the user, and the user's input is received through the high privilege mechanisms described above, the application 210 can be allowed to perform the consequential action 270, even if the user interface was not displayed by the application itself, but rather by the wrapper 310.

Because it can be impractical to create a wrapper, such as the wrapper 310, for each application, such as the application 210, the wrapper 310 can be a generic wrapper applicable to a multitude of applications. Such a generic wrapper may not be able to present detailed, or specific, notification information within the generic user interface element 320. In such a case, the generic user interface element 320 can comprise verbiage that can provide sufficient information to the user to at least enable the user to recognize that an application 210 is executing and is attempting to, or may attempt to, perform a consequential action 270.

Since the wrapper can prevent the application 210 from performing a consequential action until it has, or until the wrapper has on its behalf, displayed a user interface that can provide notification to the user of: the application 210, its actions and the context in which such actions are to be performed, the wrapper can, in one embodiment, allow the application to auto-elevate to the higher privilege level, but then contain it until the user has been notified and user input has been received. More specifically, the wrapper 310 can prevent the application 210 from performing any consequential action by placing the wrapper within an environment that will not allow for such actions, such as a "sandboxed" environment. Once the application 210, or the wrapper 310 on its behalf, displays a user interface at a high privilege level and receives high privilege input, such as from the user, the application can cease to be sandboxed by the wrapper 310 and can perform consequential actions.

In another embodiment, rather than allowing the application 210 to auto-elevate, the wrapper 310 can prevent the application from auto-elevating and can, thereby keep the application at the lower privilege level and not allow it to transition to the higher privilege level until the high privilege user interface is displayed and high privilege input is received. Once such occurs, the wrapper 310 can itself, or it can request the operating system 134 (shown in FIG. 1) to, elevate the application 210 to the higher privilege level. In addition, because the application may not be executing at the higher privilege level prior to the receipt of the high privilege input, the wrapper 310 can accept such input on behalf of the application and can then provide it to the application in conjunction with causing the application's elevation to the higher privilege level. In operating systems that may not provide existing mechanisms for elevating already executing applications, the wrapper 310 can terminate the execution of the application 210 and then re-launch it and enable it to auto-elevate to succeed in transitioning the application to the higher privilege level.

In yet another embodiment, the wrapper 310 can prevent the execution of the application 210 in the first place. Instead, the wrapper 310 itself can execute at the higher privilege level and can, again, itself, present the high privilege level user interface, or other user notification, on behalf of the application. When the wrapper 310 receives high privilege level input in response, it can then cause the execution of the application 210 and can, optionally, provide instructions or information to the application in accordance with the information received from the user input.

Figure 4:
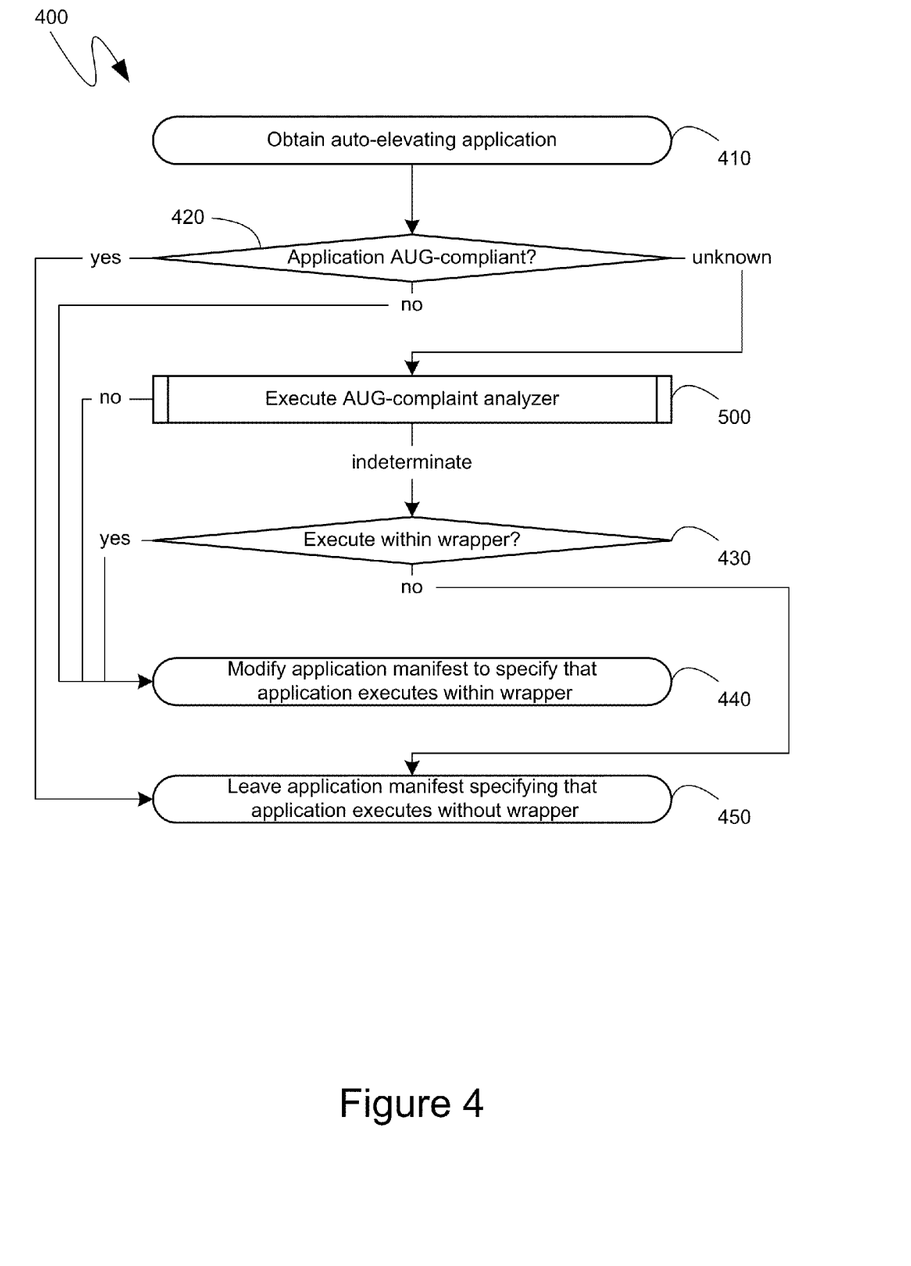
FIG. 4 is a flow diagram of an exemplary mechanism for providing for the execution of computer-executable instructions that can unobtrusively perform consequential actions.

As indicated previously, if auto-elevating applications, which automatically execute at a higher privilege level when attempting to perform consequential actions, conformed to the above-described directives, then monitoring processes, such as within the operating system 134 (shown in FIG. 1), need not prompt the user upon the automatic elevation in privilege of such an application, because such a conforming application would already have presented the user with appropriate notification and would already have received the user's consent, or instruction, to perform the consequential action. To provide for the execution of compliant auto-elevating applications, a check can be performed and applications that are known to be non-compliant, as well as, discretionarily, applications whose compliance is unknown, can be indicated to be executed within the context of a wrapper, such as the above-described wrapper 310. Turning to FIG. 4, an exemplary flow diagram 400 illustrates one aspect of such a checking.

Initially, as shown in FIG. 4, an auto-elevating application can be obtained, such as by a compliance verification entity, or by an individual user. At step 420, pre-existing knowledge about the application's conformance with the above-described directives can be considered. For ease of reference, the term "Authentic User Gestures compliant" or "AUG-compliant" will be utilized to reference auto elevating applications that do not perform consequential actions until after having presented a high privilege level user interface that provides notification about the application, its actions and other context information to the user. In one embodiment, the pre-existing knowledge considered at step 420 can comprise an examination of the executed application's metadata, which can contain indicia of whether the application is AUG-compliant, including, for example, a flag or other indicator that can be set for AUG-compliant applications, and it can further comprise out-of-band information, such as, for example, an indication of AUG-compliance that can be provided with the application, such as on the application's packaging.

Figure 5:
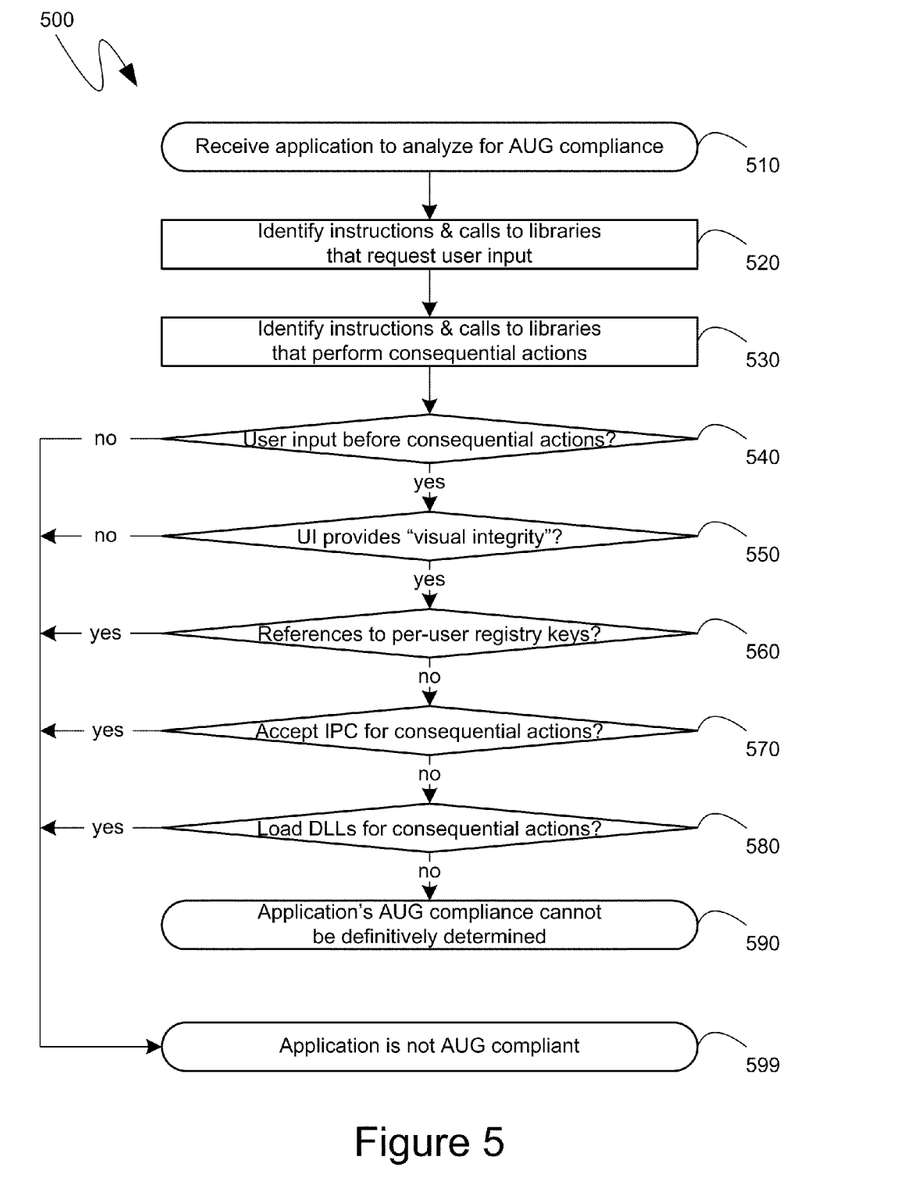
FIG. 5 is a flow diagram of an exemplary mechanism for detecting a violation of a defined set of guidelines regarding the performance of consequential actions only in response to user input.

If the pre-existing knowledge about the application at step 420 reveals that the auto-elevating application obtained at step 410 is indeed an AUG-compliant application, then processing can conclude with step 450 at which point the application is allowed to execute without a wrapper and the application's manifest so indicates. Alternatively, if the pre-existing knowledge at step 420 reveals that the auto-elevating application is not AUG-compliant, processing can conclude with step 440, at which point the application's manifest, or other relevant aspect of the application, can be modified such that the application will be executed within a wrapper. However, if, at step 420, the application's AUG compliance is unknown, processing can proceed with the steps of flow diagram 500 of FIG. 5, illustrating the execution of a static analyzer that can statically examine the application and determine if the application fails AUG compliance. As illustrated in the flow diagram 500 of FIG. 5, the execution of the static analyzer, can result in either a determination that the application is not, in fact, AUG compliant, or it can result in a determination that the application's AUG compliance cannot be determined. In the case of the former determination, as shown in the flow diagram 400 of FIG. 4, processing can proceed with step 440 and the application's manifest, or other relevant aspect of the application, can be modified such that the application will be executed within a wrapper. Alternatively, in the case of the latter determination by the static analyzer steps of flow diagram 500, a further determination can be made at step 430 in the flow diagram 400 of FIG. 4. Specifically, at step 430, the user, or AUG-compliance evaluation entity, can determine whether they wish to risk executing the application without the wrapper, such as for greater compatibility, or whether they wish to execute the application with the wrapper. If, at step 430, the former decision is reached, processing can conclude with step 450, previously described, while, if the latter decision is reached at step 430, processing can conclude with step 440, as also previously described.

Turning to FIG. 5, flow diagram 500 illustrates an exemplary series of steps that can be performed by an AUG compliance analyzer. Initially, as illustrated, at step 510, the application to be evaluated for AUG compliance can be received by the analyzer. Subsequently, at step 520, the analyzer can identify instructions, function calls, library calls, and other like programming constructs that can be utilized to request user input, or otherwise display notifications to the user. At step 530, the analyzer can identify instructions, function calls, library calls, and other like programming constructs that can be utilized to perform consequential actions, including those that can be utilized to auto-elevate execution to a higher privilege level. While step 520 is illustrated as occurring prior to step 530, the two steps can be performed in the alternative order, or even in parallel, as will be known by those skilled in the art.

Once steps 520 and 530 have been performed, the analyzer can, at step 540, determine, based on the identifications at steps 520 and 530, whether or not the evaluated application presents a user input before performing a consequential action, or otherwise auto-elevating. More specifically, the analyzer can, at step 540, determine whether one or more actions performed by programming constructs identified at step 520 occur before any actions are performed by programming constructs identified at step 530. If, at step 540, the analyzer determines that a consequential action is performed before any notification is presented to the user, then, as illustrated in FIG. 5, the analyzer can conclude that the application is not AUG compliant at step 599. However, if at step 540, the analyzer determines that consequential actions are performed only after at least one notification has been presented to the user, then processing can proceed to step 550, at which point the analyzer can verify that presented user notifications utilize appropriate visual integrity features, such as overdraw protection to prevent malicious computer executable instructions from changing the notification in an effort to trick the user, and delayed user input acceptance to minimize the chances that the user's input was actually in response to the presented user notification and not accidental or unintended. As before, if the notifications are found to be unprotected at step 550, then the analyzer can conclude, at step 599, that the application is not AUG compliant. Otherwise, processing can proceed to step 560.

At step 560, the analyzer can determine whether the application being evaluated references per-user registry keys, such as can contain information or instructions that can cause the application to perform consequential actions without prior user notification. For example, per-user registry keys can contain preferences information, such as, for example, one or more instructions that are to be executed upon startup of the application. As described above, such instructions can cause the application program to automatically attempt to perform consequential actions upon start up without first presenting a user notification. If, at step 560, the analyzer finds references to such per-user registry keys, the analyzer can conclude, at step 599, that the application is not AUG compliant. Otherwise processing can proceed further with step 570.

At step 570, the analyzer can determine whether the application being evaluated accepts inter-process communications that can cause the application to perform consequential actions prior to user notification. Similarly, at step 580, the analyzer can determine whether the application being evaluated attempts to load, or otherwise utilize, DLLs or other libraries that can be utilized for consequential actions prior to presenting user notification. As before, if the analyzer finds, at either step, that the application being evaluated does such things in contravention of the above-described directives, the analyzer can conclude, at step 599, that the application is not AUG compliant. If, however, the static evaluation of the application at steps 540 through 580 does not reveal specific situations in which the evaluated application operates in contravention of the above-described directives, relevant processing can end at step 590, and the analyzer can conclude that the applications AUG compliance cannot be definitively determined. Like steps 520 and 530 described above, steps 540 through 580 referenced independent actions, and need not be performed in a specific order illustrated in the flow diagram 500 of FIG. 5. Indeed, as will be known by those skilled in the art, the checks performed at steps 540 through 580 can be performed in any order, or can be performed wholly, or in part, in parallel.

Figure 6:
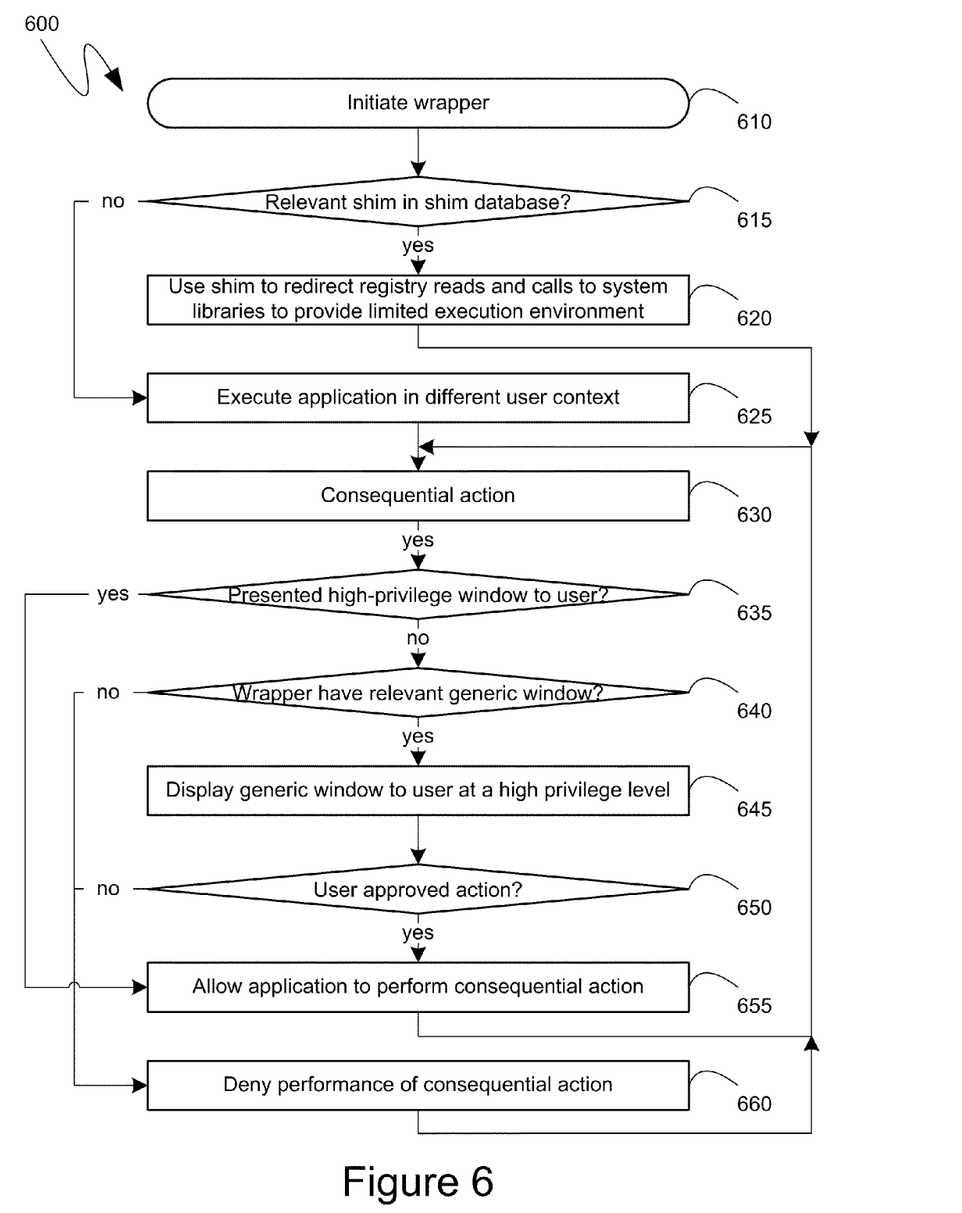
FIG. 6 is a flow diagram of an exemplary wrapper mechanism for enforcing a defined set of guidelines regarding the performance of consequential actions only in response to user input.

Turning to FIG. 6, the flow diagram 600 shown therein illustrates an exemplary series of steps that can be performed by a wrapper, such as the wrapper 310 illustrated in FIG. 3. Initially, as shown in FIG. 6, the wrapper can be initiated, or otherwise instantiated, at step 610. Subsequently, at step 615, a determination can be made as to the mechanism to be utilized to implement the functionality of the wrapper, such as that described in detail above with reference to the wrapper 310. Thus, for example, at step 615, the wrapper can check a shim database, or other relevant store, for one or more shims or other redirection mechanisms that can be utilized to provide the wrapper functionality described above. If one or more relevant shims exist, as determined at step 615, processing can proceed to step 620, where the identified shims can be utilized to perform redirections. For example, as described above, the wrapper can redirect calls to DLLs, or other libraries, including system libraries, that can be utilized to perform consequential actions, to DLLs, or other libraries, that can not perform such consequential actions including, for example, dummy libraries. As another example, the wrapper can redirect attempts to read information from the registry to other sections of the registry that may not comprise information, or instructions, that can cause the application being wrapped to perform a consequential action prior to providing notification to the user.

If, however, at step 615, the wrapper determines that no relevant shims exist, the wrapper can, in one embodiment, proceed to, at step 625, execute the wrapped application in a user context that is different from the user context of the user that initially caused the execution of the application. As will be recognized by those skilled in the art, by executing the wrapped application in a different user context, the wrapper can select an execution environment from which the application is not likely to receive input that can cause the performance of a consequential action prior to the presentation of a notification to the user. More specifically, the different user context selected at step 625 can be a user context that does not comprise many of the executing processes or data structures available in the user context within which the application was originally executed. Thus, even if the application were to attempt to receive input from the execution environment, the execution environment of the application would have little input to provide since the application was being executed in a different user context.

After the wrapper has selected a mechanism by which it can prevent the application from performing a consequential action prior to presenting a user notification, and can otherwise ensure compliance with the above-described directives, processing can proceed to step 630, at which point the wrapper can monitor the actions of the wrapped application to identify consequential actions. As shown by the flow diagram 600 of FIG. 6, once such an action is detected, at step 630, processing can proceed to step 635 at which point the wrapper can verify that a protected notification, such as a window having a higher privilege level, was presented to the user. If, at step 635, the wrapper determines that such a user notification was already provided, processing can proceed with step 655 and the wrapper can allow the application to perform the consequential action. Subsequently, as shown, processing can return to step 630.

However, if, at step 635, the wrapper determines that no user notification has been presented, or, that the user notification that was presented was not properly protected and could have been subject to malicious interference, execution can proceed to step 640 and the wrapper can check whether a relevant generic window exists that it can present on behalf of the wrapped application. If the wrapper cannot create such a generic window, relevant to the present situation, the wrapper can merely deny performance of the consequential action at step 660, and processing can return to step 630. If, however, a relevant generic window is found at step 640, then, at step 645, such a window can be displayed to the user at a high privilege level.

The user's response to such a window can be received and processed at step 650. If, at step 650, it is determined that the user did not approve the performance of a consequential action, the wrapper can deny the performance of a consequential action at step 660 and processing can return to step 630. If, however, at step 650, it is determined that the user did approve the performance of a consequential action, the wrapper can proceed to allow the application to perform the consequential action at step 655, and then again, as before, processing can return to step 630. In such a manner, a wrapper can be utilized to enable an otherwise noncompliant application to comply with the above described directives.

As can be seen from the above descriptions, mechanisms for avoiding duplicative user notifications through the use of auto-elevating applications that do not perform consequential actions until they themselves have first notified the user have been enumerated. In view of the many possible variations of the subject matter described herein, we claim as our invention all such embodiments as may come within the scope of the following claims and equivalents thereto.

We claim:

1. One or more computer-readable memory comprising a first set of computer-executable instructions for limiting a second set of computer executable instructions, the first set of computer-executable instructions directed to steps comprising:

preventing the second set of computer-executable instructions from receiving input from a lower privilege level execution environment from which the second set of computer-executable instructions was initially executed;

preventing the second set of computer-executable instructions from accessing libraries of computer-executable instructions, external to the second set of computer-executable instructions, that are part of the lower privilege level execution environment; and preventing the second set of computer-executable instructions from performing one or more consequential actions, which can only be performed at a higher privilege level, unless a higher privilege level user interface element, providing a user with notification about the second set of computer-executable instructions, was presented to the user prior to the second set of computer-executable instructions attempting to automatically elevate to perform the one or more consequential actions;

wherein the second set of computer-executable instructions automatically elevates, during execution, to the higher privilege level in order to perform the one or more consequential actions, the automatic elevation triggering a user auto-elevate notification, differing from the higher privilege level user interface element, unless the first set of computer-executable instructions is executing to limit the second set of computer-executable instructions.

2. The computer-readable memory of claim 1, wherein the preventing the second set of computer-executable instructions from receiving the input from the lower privilege level execution environment and the preventing the second set of computer-executable instructions from accessing the libraries comprises causing the second set of computer-executable instructions to execute within a different user context than an original user context within which the second set of computer-executable instructions was originally executed.

3. The computer-readable memory of claim 1, wherein the preventing the second set of computer-executable instructions from receiving the input from the lower privilege level execution environment and the preventing the second set of computer-executable instructions from accessing the libraries comprises utilizing one or more shims from an operating system shim database to redirect accessing by the second set of computer-executable instructions.

4. The computer-readable memory of claim 1, wherein the first set of computer-executable instructions performing the preventing until at the least one higher privilege level user interface element is presented comprise computer-executable instructions for preventing the second set of computer-executable instructions from performing the one or more consequential actions until both the at least one higher privilege level user interface element is presented to the user and until a higher privilege level input is received in response to the at least one higher privilege level user interface element.

5. The computer-readable memory of claim 4, wherein the higher privilege level input consists of input received from user input devices.

6. The computer-readable memory of claim 1, wherein the first set of computer-executable instructions performing the preventing the one or more consequential actions comprise computer-executable instructions for: causing the second set of computer-executable instructions to execute in the lower privilege level execution environment; and elevating the second set of computer-executable instructions to the higher privilege level after the at least one higher privilege level user interface element has been presented to the user.

7. The computer-readable memory of claim 1, wherein the first set of computer-executable instructions perform further steps comprising: generating and presenting the at least one higher privilege level user interface element.

8. The computer-readable memory of claim 7, wherein the first set of computer-executable instructions performing the preventing the one or more consequential actions comprise computer-executable instructions for: preventing the execution of the second set of computer-executable instructions until a higher privilege level input is received in response to the at least one higher privilege level user interface element; initiating the execution of the second set of computer-executable instructions after the higher privilege level input is received; and providing the higher privilege level input to the executing second set of computer-executable instructions.

9. One or more computer-readable memory comprising a first set of computer-executable instructions for statically analyzing a second set of computer-executable instructions executable on an operating system, the first set of computer-executable instructions directed to steps comprising:
identifying a first set of programming constructs within the second set of computer-executable instructions that are directed to the generation of a user interface element presented at a higher privilege level and providing a user with notification about the second set of computer-executable instructions, the user interface element differing from a user interface element generated by the operating system to notify a user of an automatic elevation by the second set of computer-executable instructions to the higher privilege level;
identifying a second set of programming constructs within the second set of computer-executable instructions that are directed to the automatic elevation, by the second set of computer-executable instructions, to the higher privilege level and the subsequent performance of one or more consequential actions that can only be performed at the higher privilege level; and
determining that the second set of computer-executable instructions is non-compliant if execution of the second set of computer-executable instructions would result in an attempted automatic elevation, via the execution of one of the second set of identified programming constructs, prior to the execution of one of the first set of identified programming constructs;
wherein the first set of computer-executable instructions performs further steps comprising:
searching the second set of programming constructs for use of external dynamically linked libraries; and
determining that the second set of computer-executable instructions is noncompliant if the searching finds use of external dynamically linked libraries.

10. The computer-readable memory of claim 9, wherein the first set of computer-executable instructions performs further steps comprising:
searching the first set of programming constructs for provision of visual integrity for any of the one or more user interface elements; and
determining that the second set of computer-executable instructions is non-compliant if the searching does not find programming constructs that provide the visual integrity for the any of the one or more user interface elements.

11. The computer-readable memory of claim 9, wherein the first set of computer-executable instructions performs further steps comprising:
searching the second set of programming constructs for references to data objects modifiable by unprivileged computer-executable instructions; and determining that the second set of computer-executable instructions is non-compliant if the searching finds programming constructs that reference data objects modifiable by unprivileged computer-executable instructions.

12. The computer-readable memory of claim 9, wherein the first set of computer-executable instructions performs further steps comprising:
searching the second set of programming constructs for interfaces accepting inter-process communication; and determining that the second set of computer-executable instructions is noncompliant if the searching finds interfaces accepting inter-process communication.

13. The computer-readable memory of claim 9, wherein the first set of computer-executable instructions perform further steps comprising:
determining that the second set of computer-executable instructions has an undeterminable compliance if execution of the second set of computer-executable instructions would result in the execution of the second set of identified programming constructs only after the execution of one of the first set of identified programming constructs.

14. A computing device comprising:
an application program that automatically elevates, during execution, to a higher privilege level to perform one or more consequential actions that can only be performed at the higher privilege level;
a wrapper for limiting the application program, the wrapper directed to steps comprising: preventing the application program from receiving input from a lower privilege level execution environment from which the application program was initially executed, preventing the application program from accessing libraries of computer-executable instructions external to the application program that are part of the lower privilege level execution environment, and preventing the application program from performing the one or more consequential actions unless a higher privilege level user interface element, providing a user with notification about the application program, was presented to the user prior to the application program attempting to automatically elevate to perform the one or more consequential actions;
an analyzer for statically analyzing the application program, the analyzer directed to steps comprising: identifying a first set of programming constructs within the application program that are directed to the generation of the higher privilege level user interface element, identifying a second set of programming constructs within the application program that are directed to the automatic elevation, by the application program, to the higher privilege level and the subsequent performance of one or more consequential actions, and determining that the application program is non-compliant if execution of the application program would result in an attempted automatic elevation, via the execution of one of the second set of identified programming constructs, prior to the execution of one of the first set of identified programming constructs; and a manifest of the application program comprising an indication, if the analyzer determined that the application program is non-compliant, that the wrapper is to be utilized with the application program;

wherein the automatic elevation, by the application program to the higher privilege level, triggers a user auto-elevate notification, differing from the higher privilege level user interface element, unless the wrapper is utilized to limit the application program.

15. The computing device of claim 14, wherein the wrapper performs further steps comprising preventing the application program from performing the one or more consequential actions until a higher privilege level input is received in response to the at least one higher privilege level user interface element.

16. The computing device of claim 14, wherein the wrapper's performance of the preventing the application program from performing the one or more consequential actions further comprises causing the application program to execute in the lower privilege level execution environment; and elevating the application program to the higher privilege level after the at least one higher privilege level user interface element has been presented to the user.

17. The computing device of claim 14, wherein the wrapper performs further steps comprising: generating and presenting the at least one higher privilege level user interface element.

18. The computing device of claim 14, wherein the analyzer performs further steps comprising: searching the first set of programming constructs for provision of visual integrity for any of the at least one higher privilege level user interface element; and determining that the application program is non-compliant if the searching does not find programming constructs that provide the visual integrity for the any of the at least one higher privilege user interface element.

19. The computing device of claim 14, wherein the analyzer performs further steps comprising: searching the second set of programming constructs for references to data objects modifiable by unprivileged computer-executable instructions; and determining that the application program is non-compliant if the searching finds programming constructs that reference data objects modifiable by unprivileged computer-executable instructions.

* * * * *